(12) United States Patent
Maehara

(10) Patent No.: US 7,683,588 B2
(45) Date of Patent: Mar. 23, 2010

(54) DEVICE FOR CONTROLLING POWER GENERATED IN VEHICLE

(75) Inventor: Fuyuki Maehara, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/222,268

(22) Filed: Aug. 6, 2008

(65) Prior Publication Data
US 2009/0039838 A1   Feb. 12, 2009

(30) Foreign Application Priority Data
Aug. 10, 2007   (JP) ............................. 2007-209358

(51) Int. Cl.
*H02P 11/00* (2006.01)
*H02P 9/10* (2006.01)

(52) U.S. Cl. ............................. 322/28; 322/59; 322/44

(58) Field of Classification Search ............ 322/24, 322/28, 44, 59; 307/10.1
See application file for complete search history.

(56) References Cited

U.S. PATENT DOCUMENTS

| | | | | |
|---|---|---|---|---|
| 5,497,069 A | * | 3/1996 | Shriver et al. | 322/19 |
| 5,508,601 A | * | 4/1996 | Good et al. | 322/37 |
| 5,684,370 A | * | 11/1997 | Watanabe | 318/151 |
| 5,754,030 A | * | 5/1998 | Maehara et al. | 322/19 |
| 7,224,148 B2 | * | 5/2007 | Watanabe et al. | 322/59 |
| 7,405,541 B2 | * | 7/2008 | Inokuchi et al. | 322/8 |
| 2006/0186863 A1 | * | 8/2006 | Yamamoto et al. | 322/28 |

FOREIGN PATENT DOCUMENTS

| | | |
|---|---|---|
| JP | A-4-322133 | 11/1992 |
| JP | A-5-336681 | 12/1993 |
| JP | A-2006-121869 | 5/2006 |

OTHER PUBLICATIONS

English translation of Notification of Reasons for Rejection for JP-2007-209358, Jul. 14, 2009, p. 1-2, Japan.

* cited by examiner

*Primary Examiner*—Julio Gonzalez R
(74) *Attorney, Agent, or Firm*—Oliff & Berridge, PLC

(57) ABSTRACT

A device for controlling vehicle power generation that controls duty cycle of an excitation winding in a vehicle power generator and controls an output voltage from the vehicle power generator to a predetermined value includes a power generation controlling circuit that, when the output voltage from the vehicle power generator is less than the predetermined value, gradually increases the value of a gradual excitation duty and gradually increases the excitation current, the gradual excitation duty being a limit value for increasing and decreasing an excitation drive duty intermittently controlling the electrification of the excitation winding, and in an opposite situation, gradually decreases a value of the excitation drive duty and gradually decreases the excitation current. The power generation controlling circuit changes the rate at which the value of the gradual excitation duty is decreased.

12 Claims, 4 Drawing Sheets

DEVICE FOR CONTROLLING POWER GENERATED IN VEHICLE

CROSS-REFERENCE TO RELATED APPLICATION

This application is related to Japanese Patent Application NO. 2007-209358 filed on Aug. 10, 2007, the contents of which are hereby incorporated by reference.

BACKGROUND OF THE INVENTION

1. Field of the Invention

The present invention relates to a device for controlling power generated in a vehicle, and in particular, to a device that controls the output voltage from a power generator mounted in vehicles such as a passenger car and a truck.

2. Description of the Related Art

In a vehicle, engine-stalling or vibration occurs when an electrical load mounted in the vehicle suddenly increases so that a rapid increase of generated power is caused, therefore increasing the torque of the power generator.

For preventing this problem, Japanese Patent Laid-open Publication No. 2006-121869 discloses a power generation controlling device that has a so-called gradual excitation control function. The gradual excitation control function suppresses the increase rate of an excitation current to a predetermined value or below.

To achieve the gradual excitation control function, the excitation is subjected to duty-control. A mean value of a driving duty (Hereafter, referred to as "FDUTY") of an excitation drive circuit is required to be calculated and then stored as a value of gradual excitation (hereinafter, referred to "stored duty"). The FDUTY is required to be controlled so that the FDUTY does not exceed the stored duty. In this case, the maximum increase rate of the excitation current is determined by the increase rate of the stored duty. In the above-described conventional power generation controlling device, the maximum increase rate of the excitation current is changed depending on the status of the vehicle, and the increase rate of power generation is set to an optimal value when the electrical load is applied.

In the power generation controlling device disclosed in Japanese Patent Laid-open Publication No. 2006-121869, the maximum increase rate of the excitation current can be changed. However, the decrease rate of the stored duty is constant. In an actual vehicle, shaky rotation caused by disturbances, and fluctuations in a relatively small, periodically-operated electrical load occur during idling. Therefore, when the gradual excitation control function operates and the decrease rate of the stored duty is high, the stored duty suppresses increase in FDUTY at all times. As a result, voltage fluctuations increase depending on the shaky rotation and the fluctuations in the electrical load. Adverse effects occur, such as lamps brightening and dimming. On the other hand, when the decrease rate of the stored duty is low, such problems do not occur. However, when the electrical load is re-introduced immediately after an amount of generated power decreases after the electrical load is disconnected, the stored duty has not yet decreased. Therefore, the amount of generated power suddenly increases without a gradual excitation control operation. Accordingly, there occur problems, such as the power generator torque sharply increasing and idling speed decreasing. In this way, the gradual excitation control function is adversely affected by the electrical load state of the vehicle (i.e., variation of an amount of the electrical load), causing voltage fluctuations and rotation decrease.

SUMMARY OF THE INVENTION

The present invention has been achieved to solve the above-described issues. An object of the present invention is to provide a device for controlling power generation that can reduce voltage fluctuations and rotation speed decrease during gradual excitation control.

To solve the above-described issues, the device of the present invention controls the duty cycle of an excitation winding to be powered intermittently in a power generator and controls the output voltage from the power generator to a predetermined value. The device includes a power generation controlling circuit that, when the output voltage from the power generator is less than the predetermined value, gradually increases a value of the gradual excitation duty and gradually increases the excitation current. The gradual excitation duty is a limiting value for increasing and decreasing the excitation drive duty intermittently controlling the excitation winding. (i.e., the limit value indicates a maximum permitted rate for increasing and decreasing the duty of the excitation winding). On the other hand, when the output voltage from the power generator is greater than or equal to the predetermined value, the power generation controlling circuit decreases the value of the excitation drive duty and decreases the excitation current. The power generation controlling circuit has a decrease rate changing means that changes the rate at which the value of the gradual excitation duty is decreased. As a result, the rate at which the value of the gradual excitation duty is decreased can be changed depending on the status of the vehicle, such as usage of an electrical load. An optimal gradual excitation control can always be performed. Voltage fluctuations of the power generator and battery, and engine rotation reduction during idling can be prevented.

The device for controlling power generation is preferably mounted on the power generator and changes the decrease rate using the decrease rate changing means, based on a signal sent from an external controlling device. As a result, the amount of the electrical load and the status of the vehicle can be easily managed by the gradual excitation control.

The above-described power generation controlling circuit preferably has an increase rate changing means that changes the rate at which the gradual excitation duty is increased. The device for controlling power generation simultaneously changes the gradual excitation for both of increase and decrease directions by using the increase/decrease rate changing means. As a result, characteristics of the gradual excitation control function can be significantly improved.

When warm-up the engine in the vehicle is completed and the vehicle is in a low idling state, the rate at which the value of the gradual excitation duty is decreased is preferably set high by the decrease rate changing means. The gradual excitation duty can be maintained at a low value through higher decrease rate of the gradual excitation duty in the low idling state. As a result, reduction in engine rotation when electrical load is applied can be prevented.

When an electrical load being used intermittently is applied, the rate at which the value of the gradual excitation duty is decreased is preferably set low by the decrease rate changing means. As a result, the gradual excitation duty during intermittent operation of the electrical load can be kept high. As a result, voltage fluctuations during the intermittent load operation can be suppressed.

When an electrical load is disconnected, the rate at which the value of the gradual excitation duty is decreased is preferably set high by the decrease rate changing means. As a result, the value of the gradual excitation duty can be quickly decreased. The gradual excitation control when the electrical load is applied can be immediately performed.

The rate at which the gradual excitation duty is decreased is preferably changed by the decrease rate changing means depending on the type of the power generator. As a result, the decrease rate of the gradual excitation duty can be set depending on torque characteristics of the power generator and attenuation characteristic of the excitation current. An optimal gradual excitation control can be performed.

The rate at which the value of the gradual excitation duty is decreased is preferably changed by the decrease rate changing means depending on engine of the vehicle. As a result, an optimal decrease rate of the gradual excitation duty can be set depending on the torque characteristics of the engine and rotation fluctuation characteristics regarding external disturbances caused by differences in inertia torque and the like. The engine rotation fluctuations and battery voltage fluctuations can be mitigated depending on the type of the engine.

When the idling speed of the engine mounted in the vehicle fluctuates, the rate at which the gradual excitation duty is decreased is preferably set high by the decrease rate changing means. Fluctuations in power generator torque can be suppressed through increasing the decrease rate of the gradual excitation duty while the idling speed is unstable. The rotation fluctuations of the engine can be suppressed.

The rate at which the value of the gradual excitation duty is decreased is preferably set regardless of the value of the gradual excitation duty. As a result, a simple circuit configuration can be achieved, and cost can be reduced.

The above-described rate at which the value of the gradual excitation duty is decreased is preferably set depending on a deviation between the value of the gradual excitation duty and the value of the excitation drive duty. As a result, the behavior of the gradual excitation duty decrease can be made similar to the attenuation characteristics of the actual excitation current. Sudden increases in the excitation current when the electrical load is disconnected can be significantly suppressed.

DETAILED DESCRIPTION OF THE PREFERRED EMBODIMENTS

An embodiment of a vehicle power generation controller of the present invention will be described with reference to FIG. 1 to FIG. 5.

Figure 1:
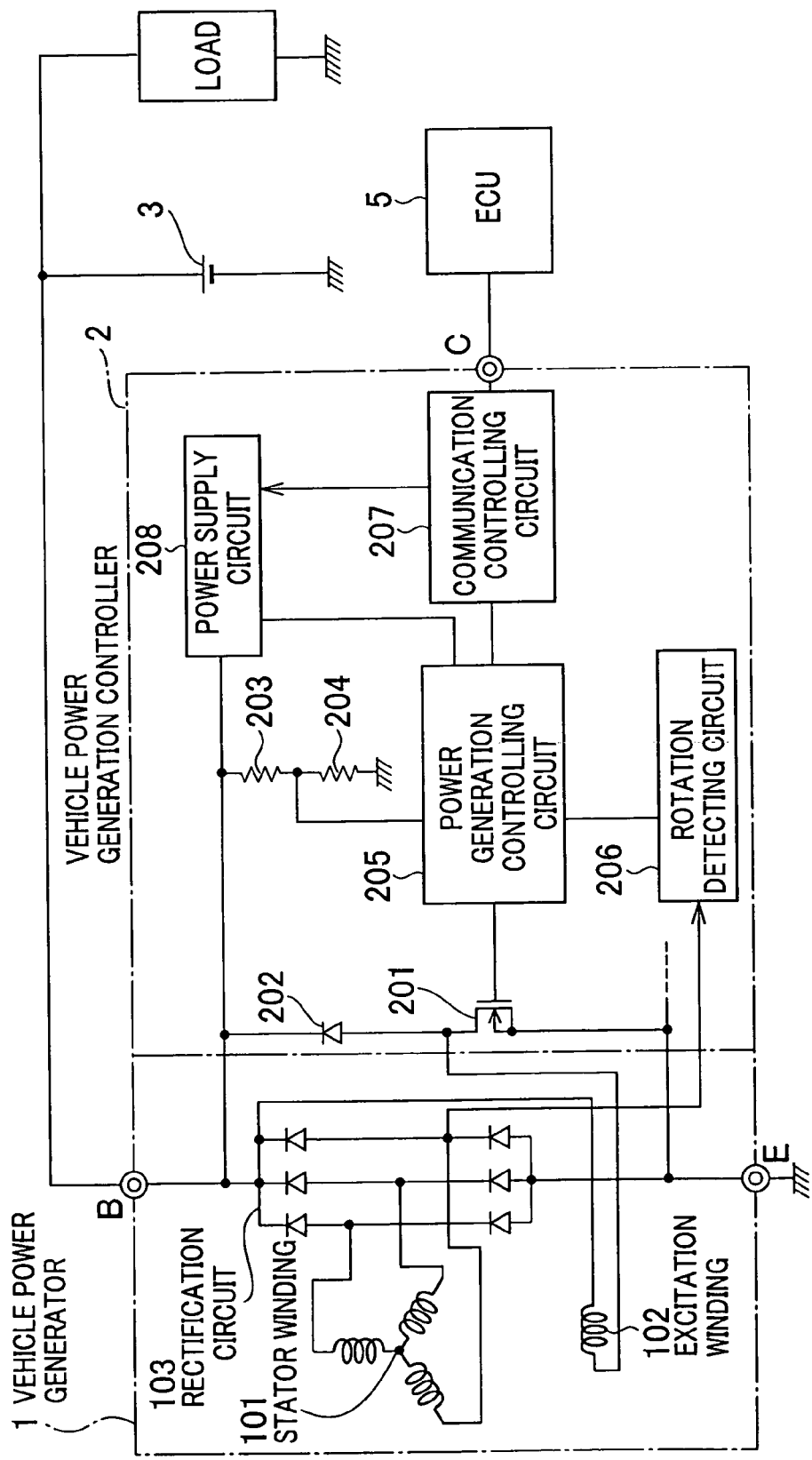
FIG. 1 is a diagram showing a configuration of a vehicle power generation controller according to an embodiment of the present invention.

FIG. 1 is a diagram showing a configuration of a power generation controller according to the present embodiment. A connection between the power generation controller and power generator, a battery, and an electronic control unit (ECU) is shown. The power generator of the present embodiment is mounted in a vehicle and generates the necessary electric power for operation of the vehicle.

In FIG. 1, the power generation controller 2 is used to constrain a voltage (power generator output voltage VB) at an output terminal (called B terminal) of the power generator 1 to a predetermined regulated voltage setting value (for example, 14V). The power generation controller 2 has, in addition to the B terminal, a communication terminal (called the C terminal) and a ground terminal (called the E terminal). The B terminal is connected to a battery 3 and in-vehicle various electrical loads via a predetermined charging line. The C terminal is connected to an ECU 5 serving as an external controlling device. The E terminal is connected to a frame of the power generator 1. In FIG. 1, the vehicle power generation controller 2 is shown in parallel with the vehicle power generator 1. However, in actuality, the power generation controller 2 is provided within the power generator 1.

The power generator 1 includes a three-phase stator winding 101, an excitation winding 102, and a rectification circuit 103. The stator winding 101 is included in a stator. The excitation winding 102 is included in a rotor. The rectification circuit 103 is provided to perform full-wave rectification on a three-phase output from the stator winding 101. An output voltage from the power generator 1 is controlled by the power generation controller 2 intermittently controlling electrification of the excitation winding 102 accordingly.

Next, a detailed configuration and operations of the power generation controller 2 will be described. As shown in FIG. 1, the power generation controller 2 includes an N-channel metal-oxide semiconductor field-effect transistor (MOS-FET) 201, a circulating diode 202, a power generation controlling circuit 205, a rotation detecting circuit 206, a communication controlling circuit 207, and a power supply circuit 208.

The MOS-FET 201 is serially connected to the excitation winding 102. When the MOS-FET 201 is ON, an excitation current flows to the excitation winding 102. The circulating diode 202 is connected in parallel to the excitation winding 102. When the MOS-FET 201 is OFF, the circulating diode 202 circulates the excitation current.

The power generation controlling circuit 205 intermittently controls the MOS-FET 201 using an excitation drive duty FDUTY. To perform gradual excitation control, the power generation controlling circuit 205 sets a gradual excitation duty "J-DUTY" that constrains the excitation drive duty FDUTY.

The rotation detecting circuit 206 monitors a phase voltage appearing at any phase of the stator winding 101, thereby detecting the rotation frequency of the power generator 1. The rotation detecting circuit 206 outputs a voltage corresponding to the detected rotation frequency. The communication controlling circuit 207 performs communication control of various signals transmitted to and received from the ECU 5 via the C terminal. The power supply circuit 208 generates a predetermined operating voltage. The above-described power generation controlling circuit 205 corresponds with a decrease rate changing means and an increase rate changing means.

The power generation controller 2 according to the embodiment is configured as described above. Control operations of the power generation controller 2 will be described next.

Figure 2:
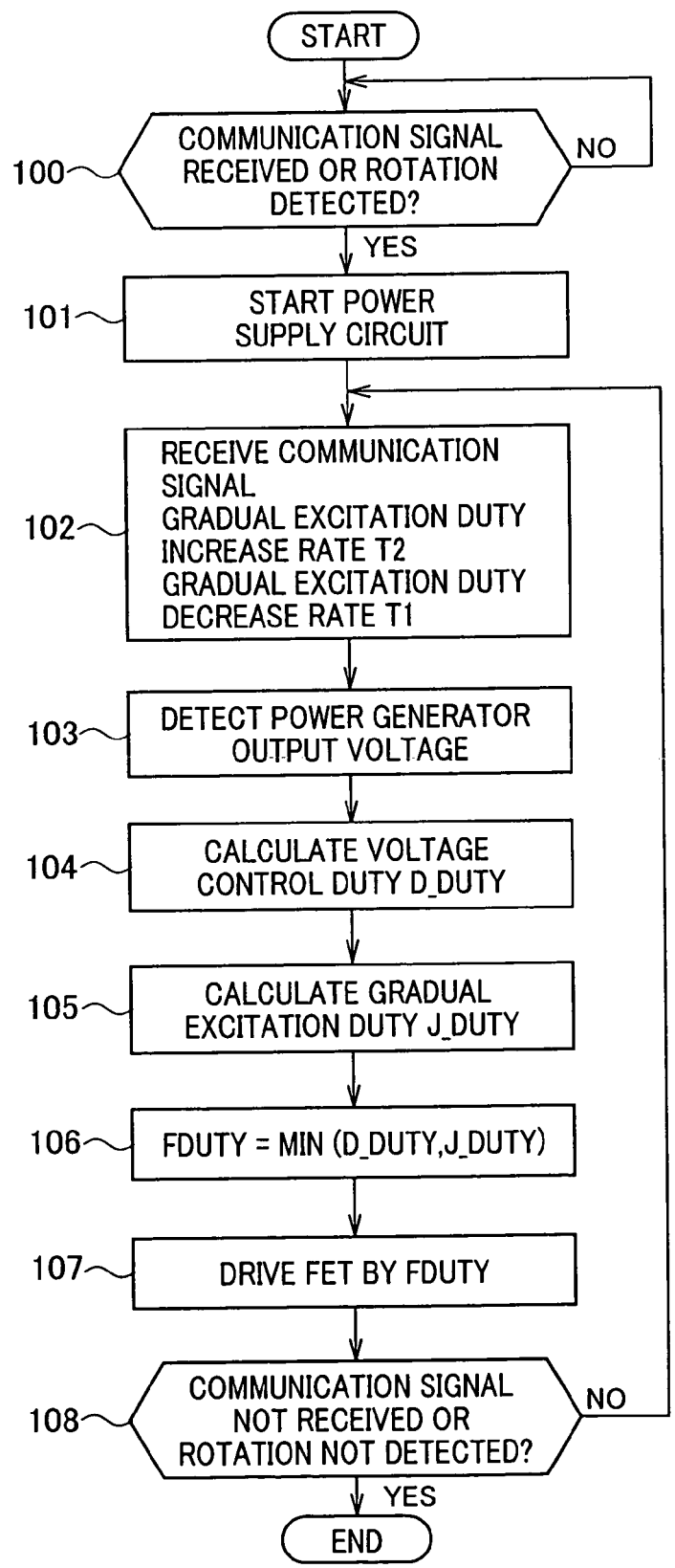
FIG. 2 is a flowchart showing operations performed by the device for controlling vehicle power generation.

Operations of the power generation controller 2 FIG. 2 is a flowchart showing operations performed by the power generation controller 2. When an ignition key switch (not shown) is turned ON, a serial communication signal is transmitted from the ECU 5 towards the C terminal of the power generation controller 2. The communication controlling circuit 207 within the power generation controller 2 monitors the C terminal and judges whether the communication signal has been received (Step 100). When no communication signal has been received, the communication controlling circuit 207 judges NO. The judgment is repeated. When the communication signal transmitted from the ECU 5 has been received via the C terminal, the judgment at Step 207 is YES. The communication controlling circuit 207 inputs a power supply ON signal towards the power supply circuit 208 (Step 101). The power supply circuit 208 starts generating an operating voltage to be supplied to each section, depending on the inputted power supply ON signal. As a result, the overall power generation controller 2 starts a predetermined power generation control operation.

Next, the power generation controlling circuit 205 sets respective values of a gradual excitation duty increase rate T2 and a gradual excitation duty decrease rate T1 based on the communication signal sent from the ECU 5 (Step 102). The gradual excitation duty increase rate T2 is a value prescribing an increase rate of a gradual excitation duty used to control an increase rate of the excitation current. The gradual excitation duty reduction rate T1 is a value prescribing a decrease rate of the gradual excitation duty. The ECU 5 variably sets the respective values of the gradual excitation duty increase rate T2 and the gradual excitation duty reduction rate T1 (details will be described hereafter).

Next, the power generation controlling circuit 205 detects the power generator output voltage VB using a voltage divider circuit configured by resistors 203 and 204 (Step S103). The power generation controlling circuit 205 calculates a voltage control duty D_DUTY based on a regulated voltage Vreg included in the communication signal sent from the ECU 5 and the power generator output voltage VB detected at Step 103 (Step 104). The voltage control duty D_DUTY is a drive duty for intermittent control of the excitation winding 102 (pulse-width modulation [PWM] control of the excitation current) by the MOS-FET 201 performed to maintain the power generator output voltage VB at the regulated voltage Vreg in a static state. Specifically, the voltage control duty D_DUTY is calculated by the following expression.

$$D\_DUTY = K1(VB - Vreg) + K2 \cdot \Delta VB/\Delta t + K3 \cdot \int (VB - Vreg) \Delta t \quad (1)$$

In this expression, K1, K2, and K3 are predetermined constant numbers. $\Delta t$ is a time period during which the voltage control duty D_DUTY is calculated. $\Delta VB$ is an amount of change in the $\Delta t$ of the power generator output voltage VB. A first item on the right side of Expression (1) indicates a value proportionate to a difference between the power generator output voltage VB and the regulated voltage Vreg. A second item on the right side is a value proportionate to an amount of change per unit time of the power generator output voltage VB. A third item on the right side is a value proportionate to an accumulated value of a difference between the power generator output voltage VB and the regulated voltage Vreg.

Next, the power generation controlling circuit 205 calculates a gradual excitation duty J_DUTY using a following expression (Step S105). The gradual excitation duty J_DUTY is a value limiting the excitation drive duty FDUTY that is a drive duty intermittently controlling the MOS-FET 201 to suppress sudden change in the excitation current.

In the static state, $$J\_DUTY = FDUTY + \alpha\_DUTY \quad (2)$$

In this expression, $\alpha$_DUTY is an amount of change in the FDUTY allowing change in the excitation current. For example, when the $\alpha$_DUTY is set to 10%, the gradual excitation control does not operate at or below 10% of change in the FDUTY. In the static state in which the amount of the electrical load and the power generation of the power generator 1 do not vary, the FDUTY does not suddenly change. Therefore, Expression (2) indicates that a value that is a sum of the FDUTY at this time and the $\alpha$_DUTY is set as the gradual excitation duty J_DUTY.

In a transient state,
1) when J_DUTY>FDUTY+$\alpha$_DUTY $$J\_DUTY = J\_DUTY - T1(J\_DUTY - (FDUTY + \alpha\_DUTY)) \quad (3)$$

The state is equivalent to when a large electrical load is disconnected. The FDUTY suddenly decreases (specifically, such that the amount of change is $\alpha$_DUTY or more). Therefore, the value that is the sum of the FDUTY and the $\alpha$_DUTY becomes smaller than the gradual excitation duty J_DUTY set using the Expression (2). In this case, a new gradual excitation duty J_DUTY is set using Expression (3).
2) when J_DUTY<FDUTY+$\alpha$_DUTY, $$J\_DUTY = J\_DUTY + T2 \quad (4)$$

The state is equivalent to when a large electric load is applied. The FDUTY suddenly increases (specifically, such that the amount of change is $\alpha$_DUTY or more). Therefore, the value that is the sum of the FDUTY and the $\alpha$_DUTY becomes greater than the gradual excitation duty J_DUTY set using the Expression (2). In this case, a new gradual excitation duty J_DUTY is set using Expression (4).

Next, the power generation controlling circuit 205 calculates the excitation drive duty FDUTY using the following expression (Step 106).

$$FDUTY = MIN(D\_DUTY, J\_DUTY) \quad (5)$$

In this expression, MIN(A,B) is a function that selects the smaller value between A and B. Through use of Expression (5), the smaller between the voltage control duty D_DUTY and the gradual excitation duty J_DUTY is set as the excitation drive duty FDUTY.

Next, the power generation controlling circuit 205 drives the MOS-FET 201 by intermittent control to achieve the excitation drive duty FDUTY (Step 107). In the static state, J_DUTY=FDUTY+$\alpha$_DUTY and D_DUTY=FDUTY. Therefore, the MOS-FET 201 is driven by the voltage control duty D_DUTY. Therefore, in the static state, the excitation current value is controlled by PWM (pulse width modulation) control of a fixed period such that the power generator output voltage VB becomes the regulated voltage Vreg.

Even when the communication signal instructing that the power be turned ON is not sent from the ECU 5, when the engine starts, a phase voltage of the stator winding 101 is generated by residual flux. Then the rotation detecting circuit 206A detects a start of the rotation. The power generation controlling circuit 205 monitors whether the rotation detecting circuit 206 detects the start of the rotation (i.e., rising edge of the rotation). When the rising edge is detected, the judgment at Step 100 is YES. The power generation controlling circuit 205 inputs a power ON signal towards the power supply circuit 208 (Step 101). In this way, even when the communication signal is not received, the overall power generation controller 2 starts the predetermined power generation controlling operation when rotation starts.

The power generation controlling circuit 205 also judges whether a state in which the communication signal has not been sent has continued for a predetermined set amount of time or more, and whether the power generator 1 is not rotating (Step 108). In a state such as this, the power generation control circuit 205 judges YES and stops generation of the operating voltage performed by the power supply circuit 208. As a result, a series of power generation controlling operations performed by the power generation controller 2 is completed.

Figure 3:
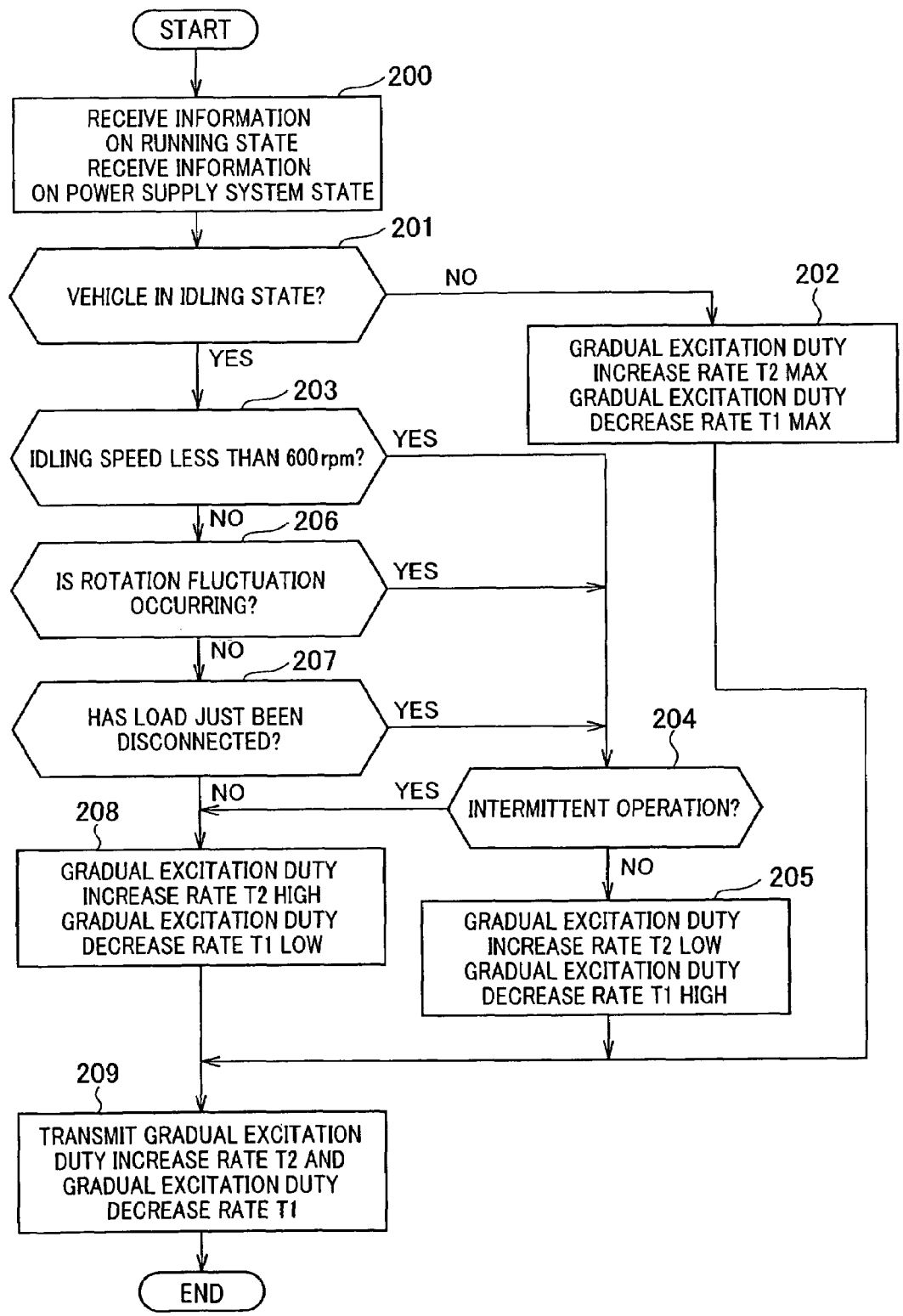
FIG. 3 is a flowchart showing operations performed by an ECU.

FIG. 3 is a flowchart of operations performed by the ECU 5. The ECU 5 receives information related to running state such as vehicle speed and engine rotation (received from, for example, a speed sensor) and receives signals related to power supply system state, such as power generation state including, for example, operating rate (excitation drive duty FDUTY) of the power generator 1, electrical load state, and a charging state of the battery 3 (Step 200).

Next, the ECU 5 judges whether the vehicle is in an idling state (Step 201). When the vehicle is not in the idling state, the ECU 5 judges NO. Next, the ECU 5 sets a maximum value as the respective values of the gradual excitation duty increase rate T2 and the gradual excitation duty decrease rate T1 (Step 202). The ECU 5 sets the maximum value to a value near the change rate of the excitation current, such as 0.2 sec/100%. The ECU 5 then transmits the gradual excitation increase rate T2 and the gradual excitation decrease rate T1 to the power generation controller 2 (Step 209). Therefore, the gradual excitation control becomes invalid in a running state other than idling. The PWM control of the MOS-FET 201 that drives the excitation current becomes equal to voltage control.

At the same time, during states other than idling, the judgment at Step 201 is YES. The ECU 5 then judges whether idling speed is less than 600 rpm (Step 203). When a warm-up state of the engine is completed, the charging state of the battery 3 is favorable, the electrical load is small, the operating rate of the power generator 1 is low, and the idling speed becomes less than 600 rpm (for example, 550 rpm). In this case, the ECU 5 judges YES at Step 203. The ECU 5 then judges whether an intermittent load operation (intermittent operation of the electrical load) has been performed (Step 204). When the intermittent load operation is not performed the ECU 5 judges NO. The ECU 5 then respectively sets the gradual excitation duty increase rate T2 to a small value (for example, 15 sec/100%) and the gradual excitation duty decrease rate T1 to a large value (for example, 0.4 sec/100%) (Step 205). The ECU 5 then transmits the gradual excitation duty increase rate T2 and the gradual excitation duty decrease rate T1 to the power generation controller 2 (Step 209).

Figure 4:
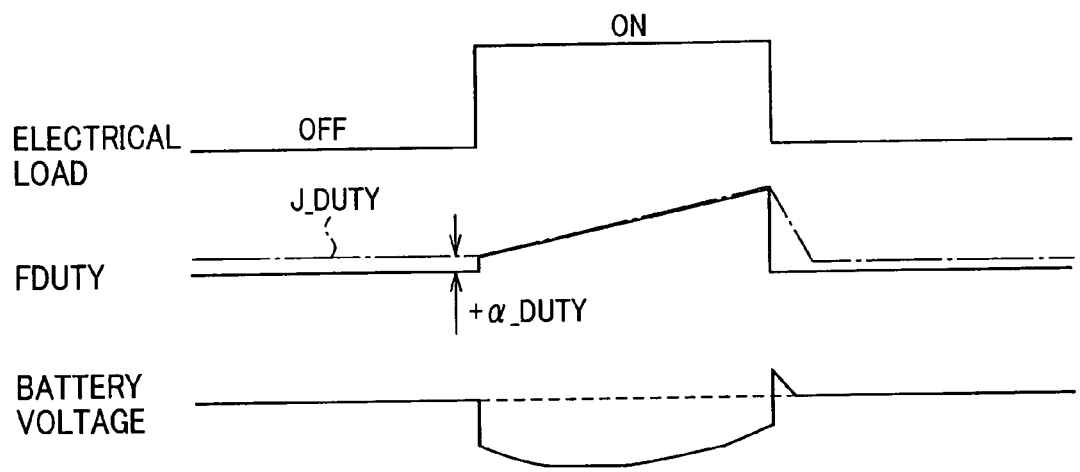
FIG. 4 is a diagram showing operation timings when an intermittent load operation is not performed.

FIG. 4 is a diagram of operation timings when the intermittent load operation is not performed. As shown in FIG. 4, the increase rate of the excitation drive duty FDUTY when the electrical load is applied decreases. The increase rate of the excitation current also decreases. Therefore, the increase rate of the drive torque of the power generator 1 also decreases, thereby allowing a reduction in engine rotation to be suppressed.

When the idling speed is 600 rpm or more, the judgment at Step 203 is NO. The ECU 5 then judges whether a rotation fluctuation has occurred (Step 206). For example, when a fluctuation in an engine rotation frequency during a predetermined amount of time is 100 rpm or more, the judgment at Step 206 is YES under an assumption that a rotation fluctuation attributed to a fluctuation in the drive torque of the power generator 1 is possible. In this case, the ECU 5 proceeds to the judgment at Step 204 of whether the intermittent load operation has been performed. When the intermittent load operation is not being performed, the gradual excitation duty increase rate T2 is set to a small value and the gradual excitation decrease rate T1 is set to a large value. Therefore, the fluctuation in the drive torque of the power generator 1 is suppressed.

When the rotation fluctuation does not occur, the judgment at Step 206 is NO. The ECU 5 then judges whether the electrical load has just been disconnected (Step 207). If the electrical load has just been disconnected, the ECU 5 judges YES. The ECU 5 proceeds to the judgment at Step 204 of whether the intermittent load operation is performed. When the intermittent load operation is performed, the gradual excitation duty increase rate T2 is set to a small value and the gradual excitation duty decrease rate T1 is set to a large value. Therefore, the gradual excitation duty is quickly changed to FDUTY+α_DUTY depending on the decrease in the excitation drive duty FDUTY after the load is removed. As a result, the gradual excitation control can be continued with certainty, even when the electrical load is applied.

When the load has not just been removed and the judgment at Step 207 is NO, or when the intermittent load operation is not performed and the judgment at Step 204 is YES, the ECU 5 sets the gradual excitation duty increase rate T2 to a large value (for example, 5 sec/100%) and sets the gradual excitation duty decrease rate T1 to a small value (for example, 1.2 sec/100%) (Step 208). The ECU 5 then transmits the gradual excitation duty increase rate T2 and the gradual excitation duty decrease rate T1 to the power generation controller 2 (Step S209).

Figure 5:
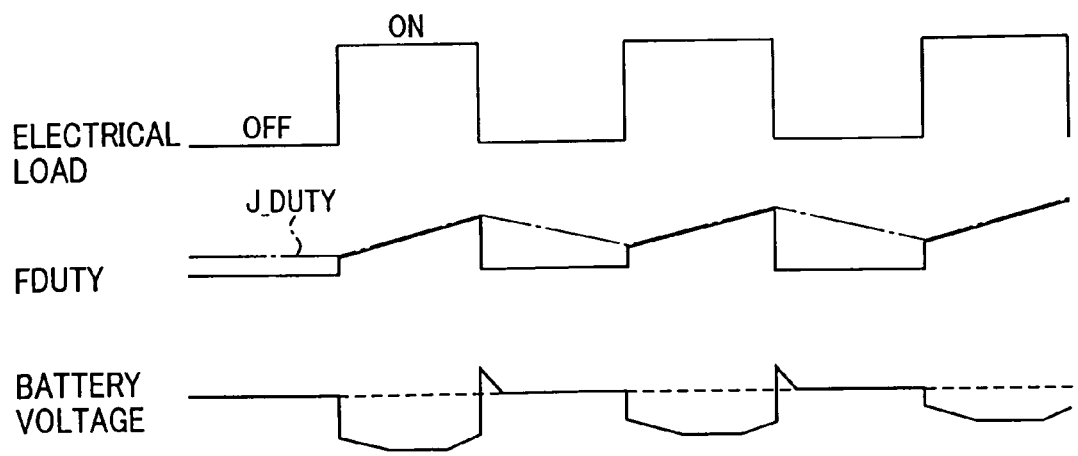
FIG. 5 is a diagram showing operation timings when an intermittent load operation is performed.

FIG. 5 is a diagram showing operation timings when the intermittent load operation is performed. As shown in FIG. 5, the decrease in the gradual excitation duty becomes slow when the electrical load is disconnected during the intermittent load operation. An amount of increase in the excitation drive duty FDUTY within a short amount of time at an application timing of the next electrical load increases. Therefore, an amount of increase in the excitation current increases, and a reduction in battery voltage can be suppressed. As a result, periodic voltage fluctuations during the intermittent load operation can be suppressed, and problems such as brightening and dimming of lamps can be prevented.

When the load has not just been removed or, in other words, when the engine rotation at idling is 600 rpm or more and stable without rotation fluctuations, the gradual excitation duty increase rate T2 is set to a large value and the gradual excitation duty decrease rate T1 is set to a small value. Therefore, the gradual excitation control can be performed to a degree allowing both a reduction in engine rotation and a reduction in battery voltage decrease.

In this way, in the vehicle system according to the embodiment, the rate at which the value of the gradual excitation duty decreases can be changed depending on the status of the vehicle, such as the application state of the electrical load. An optimal gradual excitation control can always be performed. Voltage fluctuations in the power generator 1 and the battery 3, and engine rotation decrease during idling can be prevented.

The rate at which the value of the gradual excitation duty decreases is changed by the communication signal sent from the ECU 5. As a result, the application state of the electrical load and the status of the vehicle can be easily reflected in the gradual excitation control.

The power generation controlling circuit 205 simultaneously changes the decrease rate of the gradual excitation duty and changes the increase rate of the gradual excitation duty (operations performed by the power generation controlling circuit 205 corresponding to the operations performed by the ECU 5 at Steps 205 and 208). As a result, characteristics of the gradual excitation control function can be significantly changed.

The gradual excitation duty can be maintained at a low value through increase of the decrease rate of the gradual excitation duty in a low idling state. As a result, reduction in engine rotation when the electrical load is applied can be suppressed. The voltage fluctuation can be suppressed during the intermittent operation.

The value of the gradual excitation duty can be kept high during the intermittent operation of the electrical load when the rate at which the value of the gradual excitation duty is decreased is set low when the intermittently-operated electrical load is applied. As a result, voltage fluctuations during the intermittent operation can be suppressed.

The value of the gradual excitation duty can be quickly decreased when the rate at which the value of the gradual excitation duty is decreased is set high when the electrical load is disconnected. As a result, the gradual excitation control during application of the electrical load can be immediately performed.

The fluctuations in power generator torque can be suppressed and the fluctuations in the engine rotation can be suppressed when the rate at which the value of the gradual excitation duty decreases is set high when the idling speed is unstable.

Behavior of the decrease in the gradual excitation duty can be made similar to attenuation characteristics of the actual excitation current by the rate at which the value of the gradual excitation duty decreases being set depending on the difference between the value of the gradual excitation duty and the value of the excitation drive duty (second item on the right side of Expression [3]). As a result, sudden increases in the excitation current when the electrical load is disconnected can be suppressed to a minimum.

The present invention is not limited to the above-described embodiment. Various modified embodiments falling within the scope of the spirit of the invention can be made. For example, the rate at which the value of the gradual excitation duty is decreased can be changed depending on the type of the power generator 1. Specifically, the ECU 5 can variably set the gradual excitation duty increase rate T2 and the gradual excitation duty decrease rate T1 depending on the type of the power generator 1. As a result, the decrease rate of the gradual excitation duty can be set depending on torque characteristics of the power generator 1 and attenuation characteristics of the excitation current. An optimal gradual excitation control can be performed.

The rate at which the value of the gradual excitation duty is decreased can be changed depending on the vehicle engine. Specifically, the ECU 5 can variably set the value of the gradual excitation duty increase rate T2 and the value of the gradual excitation duty decrease rate T1 depending on the type of the vehicle engine. As a result, an optimal decrease rate of the gradual excitation duty can be set depending on torque characteristics of the power generator 1 and rotation fluctuation characteristics regarding external disturbances caused by differences in inertia torque and the like. The engine rotation fluctuations and battery voltage fluctuations can be placed in optimal states depending on the type of the engine.

According to the above-described embodiment, as indicated by the second item on the right side of the Expression (3), the rate at which the value of the gradual excitation duty is decreased is set depending on the deviation between the value of the gradual excitation duty and the value of the excitation drive duty. However, the rate can be set regardless of the value of the gradual excitation duty. Specifically, Expression (3a) shown below can be used instead of the Expression (3).

$$J\_DUTY = J\_DUTY - T1 \tag{3a}$$

As a result, a simple circuit configuration can be achieved and cost can be reduced.

What is claimed is:

1. A device for controlling power generated in a vehicle provided with an engine, a power generator generating power to an electrical load mounted on the vehicle, the power generator having an excitation winding through which an excitation current is supplied such that the excitation current is intermittently controlled and an output voltage outputted from the power generator is regulated at a predetermined value, the device comprising:

a power generation controlling circuit that controls the excitation current by driving the excitation winding using a variable duty cycle, wherein the power generation controlling circuit increasingly changes the duty cycle so as to increase the excitation current when the output voltage from the power generator is less than the predetermined value, and decreasingly changes the duty cycle so as to decrease the excitation current when the output voltage from the power generator is equal to or more than the predetermined value;

duty cycle control means for controlling the duty cycle to be changed based on an amount of the electrical load and a rotation status of the engine;

first changing means for changing an increase rate of the duty cycle by setting a gradual excitation duty that limits the duty cycle which is changed increasingly; and second changing means for changing a decrease rate of the duty cycle by setting the gradual excitation duty that limits the duty cycle which is changed decreasingly.

2. The device according to claim 1, wherein
the device is mounted on the power generator and sets the decrease rate of the duty cycle based on a signal sent from an external control device.

3. The device according to claim 1, wherein
the device is mounted on the power generator and sets the increase rate of the duty cycle based on a signal sent from an external control device.

4. The device according to claim 1, wherein the first changing means and the second changing means simultaneously set the each value of the gradual excitation duty.

5. The device according to claim 1, wherein
when the rotation-status of the engine is in an idling state, the rate at which the value of the gradual excitation duty is decreased is risen by the second changing means.

6. The device according to claim 1, wherein
when an intermittently-controlled electrical load to be consumed in the vehicle is applied, the rate at which the value of the gradual excitation duty is decreased is lowered by the second changing means.

7. The device according to claim 1, wherein
when an electrical load to be consumed in the vehicle is disconnected, the rate at which the value of the gradual excitation duty is decreased is risen by the second changing means.

8. The device according to claim 1, wherein
depending on a type of the power generator, the rate at which the value of the gradual excitation duty is decreased is changed by the second changing means.

9. The device according to claim 1, wherein
depending on a type of the engine mounted on the vehicle, the rate at which the value of the gradual excitation duty is decreased is changed by the second changing means.

10. The device according to claim 1, wherein
when a rotation speed of the engine in the idling state fluctuates, the rate at which the value of the gradual excitation duty is decreased is risen by the second changing means.

11. The device according to claim 1, wherein
the rate at which the value of the gradual excitation duty is decreased is set regardless of the value of the gradual excitation duty.

12. The device according to claim 1, wherein
the rate at which the value of the gradual excitation duty is decreased is set depending on the difference between the value of the gradual excitation duty and the value of the excitation drive duty.

* * * * *